(12) United States Patent
Gross et al.

(10) Patent No.: US 8,823,580 B2
(45) Date of Patent: Sep. 2, 2014

(54) FMCW RADAR SENSOR AND METHOD FOR FREQUENCY MATCHING

(75) Inventors: Volker Gross, Ditzingen (DE); Wolf Steffens, Herrenberg (DE); Stephan Leinbaum, Weinsberg (DE); Goetz Kuehnle, Hemmingen (DE); Andre Treptow, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 461 days.

(21) Appl. No.: 13/262,913

(22) PCT Filed: Feb. 17, 2010

(86) PCT No.: PCT/EP2010/051951
§ 371 (c)(1),
(2), (4) Date: Dec. 19, 2011

(87) PCT Pub. No.: WO2010/115651
PCT Pub. Date: Oct. 14, 2010

(65) Prior Publication Data
US 2012/0146835 A1    Jun. 14, 2012

(30) Foreign Application Priority Data

Apr. 7, 2009 (DE) .......................... 10 2009 002 243

(51) Int. Cl.
G01S 13/42 (2006.01)
G01S 13/58 (2006.01)
G01S 13/34 (2006.01)
G01S 13/93 (2006.01)

(52) U.S. Cl.
CPC ............. *G01S 13/584* (2013.01); *G01S 13/347* (2013.01); *G01S 13/42* (2013.01); *G01S 13/931* (2013.01)
USPC .................. 342/109; 342/70; 342/71; 342/85; 342/130; 342/192

(58) Field of Classification Search
CPC ..... G01S 13/931; G01S 13/584; G01S 13/34; G01S 13/347; G01S 13/42; G01S 13/583; G01S 13/588
USPC ...................... 342/109, 70–72, 84–88, 98–99, 342/111–112, 115–116, 128–130, 192
See application file for complete search history.

(56) References Cited

U.S. PATENT DOCUMENTS 4,146,890 A * 3/1979 Klensch ......................... 342/105
6,924,762 B2 * 8/2005 Miyake et al. .................. 342/70
(Continued)

FOREIGN PATENT DOCUMENTS

DE          102 43 811      4/2004
DE     10 2007 043 535      3/2009
(Continued)

OTHER PUBLICATIONS

International Search Report of PCT/EP2010/051951, dated Jun. 23, 2010.

*Primary Examiner* — John B Sotomayor
(74) *Attorney, Agent, or Firm* — Kenyon & Kenyon LLP

(57) ABSTRACT

In a method for frequency matching in an FMCW radar sensor, a plurality of frequencies, which are derived on various modulation ramps, and which respectively are shown by the radar sensor in a d-v space as geometrical locations, represent possible combinations of a distance d and a speed v of the respective object. In order to identify the objects located on the various modulation ramps, coincidences between the geometrical locations which belong to frequencies derived on various modulation ramps are searched for. The search for coincidences is initially restricted in a first step to a subspace of the d-v space, and in a subsequent step, the search is extended to other regions of the d-v space, while suppressing the frequencies that are associated with the objects found in the first step.

12 Claims, 5 Drawing Sheets

(56) References Cited

U.S. PATENT DOCUMENTS

| | | |
|---|---|---|
| 8,436,764 B2 * | 5/2013 | Reiher et al. .................... 342/70 |
| 2004/0252047 A1 * | 12/2004 | Miyake et al. ................ 342/107 |
| 2009/0121915 A1 * | 5/2009 | Randler et al. .................. 342/70 |
| 2009/0219190 A1 * | 9/2009 | Lehre et al. ..................... 342/71 |
| 2009/0224960 A1 * | 9/2009 | Ishii et al. ..................... 342/104 |
| 2009/0315761 A1 * | 12/2009 | Walter et al. .................. 342/200 |
| 2011/0181456 A1 * | 7/2011 | Luebbert et al. ................ 342/70 |
| 2011/0309968 A1 * | 12/2011 | Reiher et al. .................... 342/70 |
| 2012/0146835 A1 * | 6/2012 | Gross et al. ................... 342/109 |

FOREIGN PATENT DOCUMENTS

| | | |
|---|---|---|
| JP | 11-271429 | 10/1999 |
| JP | 2003-185738 | 7/2003 |
| JP | 2006-300720 | 11/2006 |
| JP | 2008-503739 | 2/2008 |
| JP | 2008-533495 | 8/2008 |

* cited by examiner

FMCW RADAR SENSOR AND METHOD FOR FREQUENCY MATCHING

CROSS-REFERENCE TO RELATED APPLICATIONS

This application is a national stage application of International Application No. PCT/EP2010/051951, filed Feb. 17, 2010, which claims foreign priority benefits under 35 U.S.C. §119 to German Application No. 10 2009 002 243.0, filed Apr. 7, 2009, all of which are hereby incorporated by reference in their entirety.

BACKGROUND OF THE INVENTION

1. Field of the Invention

The present invention relates to a method for frequency matching in an FMCW radar sensor, in which a plurality of frequencies, which are derived on various modulation ramps, and which represent, in each case, an object located by the radar sensor, are shown in a d-v space as geometrical locations which represent possible combinations of distance d and speed v of the respective object, and, in order to identify the objects located on the various modulation ramps, coincidences are searched for between the geometrical locations which belong to frequencies derived on various modulation ramps. The present invention also relates to an FMCW radar sensor in which this method is implemented, and which is able to be used in a driver assistance system for motor vehicles.

2. Description of Related Art

The functional principle of an FMCW radar sensor (frequency modulated continuous wave) is that the frequency of the transmitted radar signal is ramp modulated, and the signal reflected by an object and received again by the sensor is mixed with a part of the signal sent at the receiving time. The mixed product then includes an intermediate frequency component whose frequency corresponds to the difference between the sent and the received signal. This difference is a function, on the one hand, of the object distance, because of the change in the sending frequency that has occurred during the signal propagation time, but on the other hand, it is also a function of the relative speed of the object, because of the Doppler effect.

The intermediate frequency signal is separated by fast Fourier transformation into its frequency spectrum, and each located object is represented in this spectrum by a peak at one frequency, which is a function of the distance and the speed (relative speed) of the object. However, with the aid of this individual frequency, one cannot yet determine unequivocally the actual distance and the actual speed of the object. To do this, it is rather required to locate the same object on at least two modulation ramps of the sent signal, these modulation ramps having to have different slopes.

Each of the two frequencies then represents a multiplicity of possible combinations of distance d and relative speed v of the object. In a d-v space in which the speed of the object is plotted against its distance, the geometrical location of the possible combinations of distance and speed for a given frequency is a straight line whose slope is a function of the slope of the modulation ramp. Thus, for two ramps, one obtains two straight lines having different slopes, and whose intersection, that is, the point, at which the coincidence exists between the geometrical locations associated with the two frequencies, gives the true distance and the true speed of the object.

If more objects are simultaneously located in the locating area of the radar sensor, there is the problem, however, that even in the evaluation of two modulation ramps it cannot be unequivocally determined which peak belongs to which object. For a situation having two objects, one obtains in the d-v space, for example two pairs of parallel straight lines which form four intersections with one another, but only two of these intersections are able to correspond to real objects, while the other intersections represent so-called apparent objects.

In order to obtain unequivocal results, at least a third modulation ramp is required. Real objects may be detected in that coincidence between all three geometrical locations exists in the d-v space, which belong to the frequencies which were obtained on the three different frequency ramps. Graphically this means that all three straight lines, that correspond to the three frequencies, intersect in a point, within the scope of accuracy limits. This coincidence test is designated as frequency matching.

Since, however, the frequencies of the peaks are able to be determined only with limited accuracy, one cannot expect, for a real object, that the three straight lines, that belong to the three modulation ramps, will intersect exactly at one point. One will rather obtain three different intersections, which will lie relatively close to one another, however. Therefore, in order to be able to identify an object at all, a certain tolerance has to be admitted. However, if a large number of objects is located, this tolerance may, in turn, lead to the occurrence of apparent coincidences, so-called false matches, with which no real objects are associated.

In practice, one often works with four different modulation ramps, and the criterion for a real object is that all four straight lines intersect at one point, within the scope of the tolerance limits. Even then, false matches could occur, especially when the number of objects, and thus the density of the peaks in the spectra, is relatively high. The false match rate is proportional to the size of the section of the d-v space, but increases disproportionally with increasing object density and increasing variance of the peak frequencies.

In addition, the computing time required also increases with an increasing number of objects and an increasing number of modulation ramps. Since at least the frequencies obtained on two ramps have to be combined pair-wise with each other, the computing time increases at least quadratically with the number of objects. Such an increase in the computing time is a problem, however, in many applications. This applies, for instance, to the use of an FMCW radar in an adaptive cruise control system for motor vehicles. In that case, the distances and the relative speeds of all preceding vehicles have to be updated in such short time intervals that traffic events may be followed with sufficient accuracy and a distance control is made possible that is appropriate to the situation.

In published German patent application document DE 102 43 811 A1, a method is described for frequency matching in an FMCW radar for motor vehicles, in which the development over time of the distances and relative speeds of the located objects are followed across several measuring cycles of the radar sensor, and false matches in the current measuring cycle are detected with the aid of implausible "jumps" in the dynamic variables of the supposed object. However, this method too requires a great computing effort.

BRIEF SUMMARY OF THE INVENTION

It is an object of the present invention to state a method for frequency matching which requires a low computing effort and has a low false match rate at the same time.

This object is attained according to the present invention in that, in a first step, the search for coincidences is limited to a subspace of the d-v space, and in a subsequent step, the search is extended to other regions of the d-v space, however, under suppression of the frequencies that are associated with the objects found in the first step.

A more accurate analysis of the dependence of the false match rate on parameters of the frequency matching procedure shows that the false match rate goes down when the search for coincidences is restricted to a smaller region within the d-v space. Even at a high object density, most apparent coincidences will then lie outside of the region observed. Now, after the objects within this restricted region have been identified, the appertaining frequencies and the straight lines corresponding to them in the d-v space are isolated, so to speak, and the search continues only for intersections between the remaining straight lines. Consequently, since the object density is less in the subsequent step, the false match rate is clearly reduced in the further search for coincidences.

Because of the initial restriction of the investigated region in the d-v space, the number of combinations of frequencies to be investigated, and thus the required computing time, is considerably reduced at the same time.

Advantageous embodiments of and further refinements of the present invention are delineated in the dependent claims.

In one advantageous specific embodiment, especially for the use of the radar sensor in driver assistance systems of motor vehicles, the search for coincidences in the first step is limited to a subspace of the d-v space that has a particularly great relevance and/or plausibility for the respective assistance function. If, for example, the assistance function supported by the radar sensor is a distance control function, one may limit oneself first to the region of the d-v space in which a direct control intervention would be required in order to maintain the setpoint distance from the directly preceding vehicle.

Another possibility of a meaningful restriction of the d-v space is to restrict oneself first to one or more subspaces in which, based on results gathered in the past, an object is to be expected with high probability. In a driver assistance system for motor vehicles, for instance, the development over time of the distances and the relative speeds of the located objects is typically followed over a longer period of time, within the scope of a tracking procedure, based on the results gathered in the past, it is predicted at what distance and what relative speed the followed object will probably be located in the next measuring cycle. It is therefore expedient to restrict the search for coincidences first to comparatively small cells in the d-v space which lie in the neighborhood of those points for which, because of the tracking procedure, the existence of an object is predicted.

Another possibility for motor vehicle applications is to restrict the search to standing objects, that is, to search for objects whose relative speed is the same as the travel speed of the host vehicle in absolute amount. The respective subspace of the d-v space is then a narrow tube about the relative speed.

It is also advantageous if the observed part of the d-v space is successively restricted in a plurality of steps. Each step may be subdivided into substeps, in this context, in which differently strict criteria apply for the frequency matching, be it with respect to accuracy of the coincidence or with respect to the number of the frequencies for which coincidence is demanded. If, for example, one is working with four different ramp slopes, and one thus obtains in principle four straight lines for each object in the d-v space, one may first search for coincidences in which all four straight lines intersect at one point, and then search for coincidences in which only three straight lines intersect at one point.

In one advantageous specific embodiment, in the last step of the method, a "residual matching" is carried out, in which some of the frequencies previously isolated, for instance, those whose peaks had a particularly high power, are inserted again. In this way one is also able to identify objects which remained hidden in the preceding steps, based on frequency superpositioning.

DETAILED DESCRIPTION OF THE INVENTION

Figure 1:
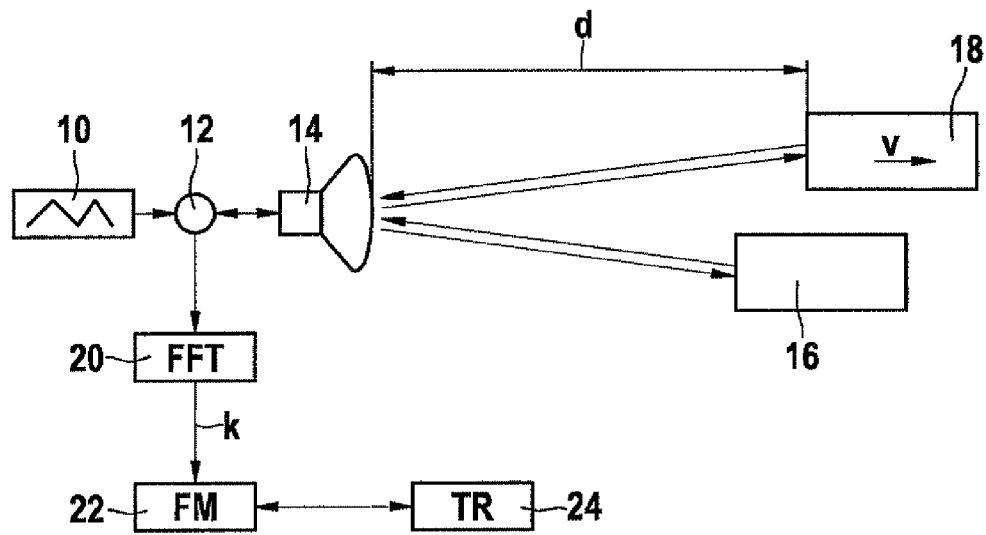
FIG. 1 shows a block diagram of an FMCW radar sensor.

FIG. 1 is a block diagram of an FMCW radar sensor as is used, for instance, within the scope of a driver assistance systems for motor vehicles, such as for locating preceding vehicles with the aim of controlling the distance from the directly preceding vehicle.

The radar sensor has a driver 10, which supplies a radar signal having a ramp modulated frequency via a mixer 12 to a send and receive unit 14. As is shown symbolically in FIG. 1 in the block which represents the driver 10, the ramp-shaped frequency modulation is, in this case, a sequence of four frequency ramps having different slopes, the first and the second ramp and the third and the fourth ramps each having equal and opposite slopes. This modulation pattern then repeats in each measuring cycle of the radar sensor.

In the example shown, the radar radiation emitted by send and receive unit 14 is reflected from two objects 16, 18, which may be preceding vehicles, for example. The reflected signal is received again by send and receive unit 14 and mixed in mixer 12 with the signal supplied at this time currently by driver 10. The mixed product is an intermediate frequency signal, whose frequency is a function of the frequency difference between the sent signal and the received signal. This frequency difference, on its part, is both a function of the distance d of the object and of its speed v (relative speed).

In a transformation step 20, the intermediate frequency signal for each modulation ramp is separated into its spectrum by fast Fourier transformation (FFT). The frequency spectra one obtains in this manner for the four successive modulation ramps, in the ideal case have one peak for each object, at a frequency k, which is determined by the distance and the speed of the object and the slope of the modulation ramp. The frequencies k are further analyzed in a frequency matching module 22, in order to identify the individual objects and to determine their distances and speeds. The method used for this will be explained in greater detail below.

The results of the frequency matching, that is, in particular, the distances and speeds of all located objects, are supplied to a tracking module 24 (TR), which traces the history of the dynamic data (distances and speeds and also the heading angle, in a radar having angular resolution) of the located objects and thus follows the development over time of the objects and projects it into the future. This procedure, which is designated as the tracking procedure, thus supplies for each object predictive values for the distance to be expected and the speed to be expected in the next measuring cycle. These predictive values are used, in frequency matching module 22, to shorten the computing time required for the frequency matching procedure, and to reduce the frequency of false matches.

Figure 2:
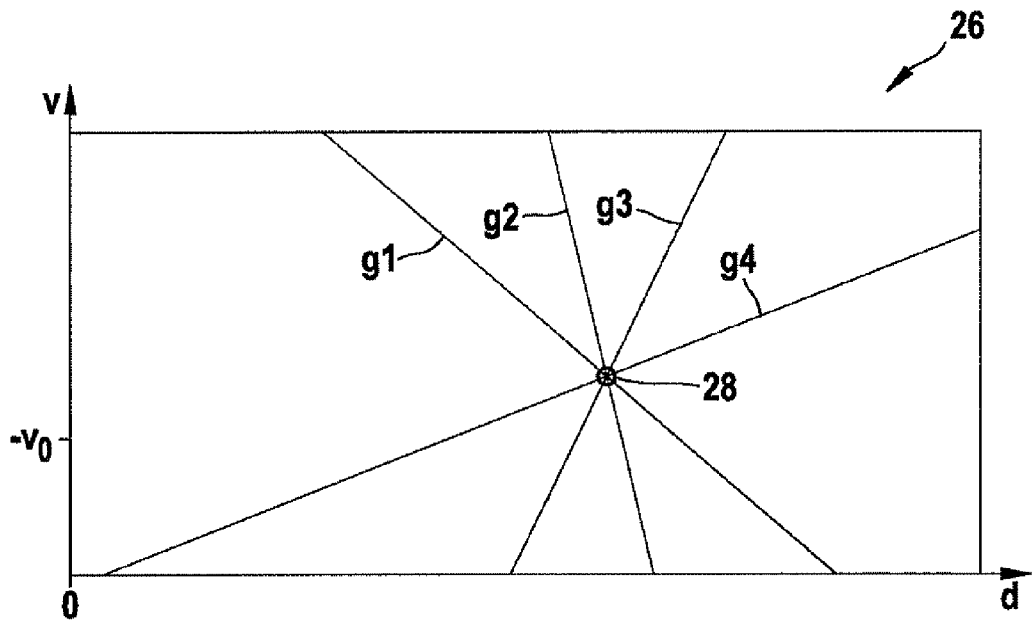
FIG. 2 shows a diagram of a d-v space for a single object that has been located on four different modulation ramps.

FIG. 2 shows a diagram of a d-v space, in which distance d is given on the abscissa and speed v is given on the ordinate. Speed v is the relative speed of object 16 or 18 relative to host vehicle speed $v_0$, in this instance, that is equipped with the radar sensor. Consequently, a positive speed v means that the object is distancing itself from the host vehicle, and a negative speed v means that the host vehicle is closing the gap to the object. For standing objects, i.e. objects whose absolute speed is zero, $v=-v_0$.

A single object is represented in d-v space 26 by a point 28, whose abscissa gives distance d of this object and whose ordinate gives its speed v.

When a single object is located by the radar sensor, then, for the frequency k of the corresponding peak in the spectrum, the following relationship applies:

$$K=\alpha^*d+\beta^*v \quad (1)$$

In this equation, $\alpha$ is a constant that is a function of the slope of the modulation ramp. Constant $\beta$ is proportional to the frequency of the radar signal and determines the speed dependence of frequency k based on the Doppler effect.

Rearranging terms yields:

$$v=-(\alpha/\beta)^*d+(k/\beta) \quad (2)$$

Equation (2) is the equation of a straight line in the d-v space. This straight line is the geometrical locus of all combinations of distance d and speed v which the object may have, that the peak at frequency k has generated.

In FIG. 2, four such straight lines g1-g4 are shown, one each for each modulation ramp. Since constant $\alpha$ is a function of the ramp slope, these four straight lines also differ in their slopes. In the ideal case, without taking into account the effect of measuring errors, all four straight lines g1-g4 should intersect exactly at a point 28, as shown in FIG. 2.

Figure 3:
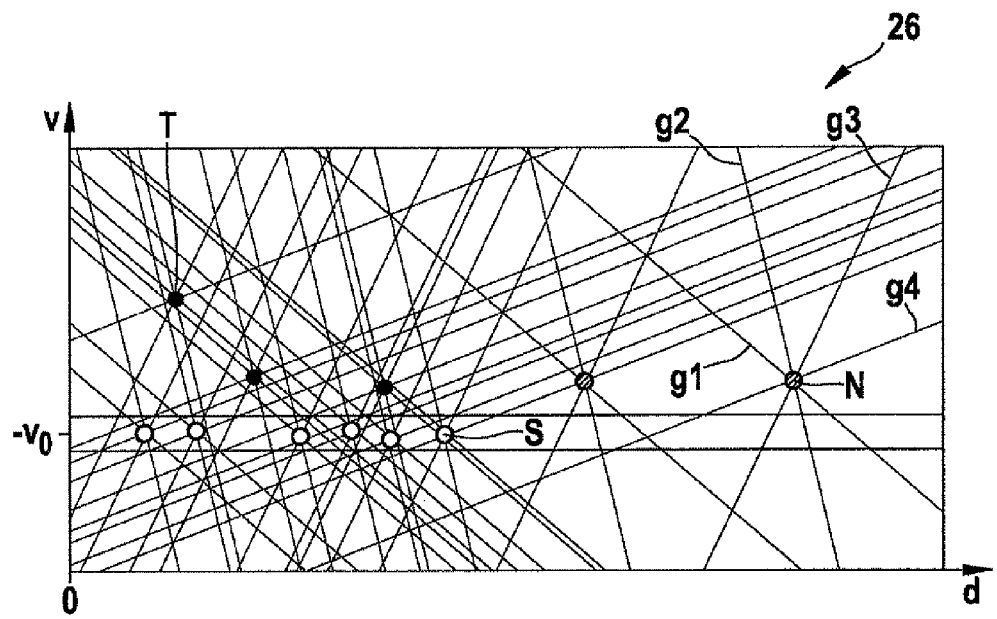
FIG. 3 shows a diagram of a d-v space having a plurality of located objects.

FIG. 3 shows d-v space 26 for the case in which eleven objects are being located simultaneously. Correspondingly, the diagram includes eleven points T, S and N which each are at an intersection of four straight lines g1-g4 and are designated as coincidences in this case. Since four such straight lines g1-g4 are obtained for each object, there comes about a confusing multitude of $11^2=121$ straight line intersections, of which, however, a few may lie outside of the section of the d-v space that is being observed. Only eleven of these intersections correspond to real objects.

The real objects should theoretically stand out in that all four straight lines g1-g4 intersect exactly at the same point. Because of statistical measuring errors, this is only approximately the case in practice, however. Because of this inaccuracy, it is often not simple to decide whether four given straight lines, in this sense, intersect at one point or not. Such doubtful cases occur the more frequently, the greater the number of objects, and accordingly the more densely the straight lines lie in the d-v space.

To make things more difficult, in some cases, two peaks may also be so close together that they cannot any longer be resolved to two separate peaks, and, as a result, they are represented in the d-v space by a single straight line. As will be explained in greater detail below, it may therefore also happen that real objects are represented by one point at which only three straight lines intersect.

If exactly three straight lines intersect, one may call this a triple coincidence, and if all four straight lines intersect, a quadruple coincidence.

In frequency matching module 22, the course of all straight lines in the d-v space is represented in electronic form. Each straight line may be represented by its straight-line equation (2), for example, and for k, in each case, measured frequency k (vertex frequency) should be used. In order to detect the coincidences and to identify the corresponding objects, in principle, for each pair of non-parallel straight lines it would have to be tested computationally whether at least one additional straight line runs through its intersection.

A method will be described below which permits reducing the computational effort for the search for coincidences and, at the same time, reducing the frequency of "false matches" which are created by cases in which, by chance, three or four straight lines intersect at approximately the same point would be wrongly interpreted as coincidences, although, in reality, no object exists having the values of the distance and the speed given.

On this matter, it should first be assumed that tracking module 24, based on the results obtained in previous measuring cycles, already supplies predictive values for the distances and speeds of the objects located so far and followed up.

Figure 4:
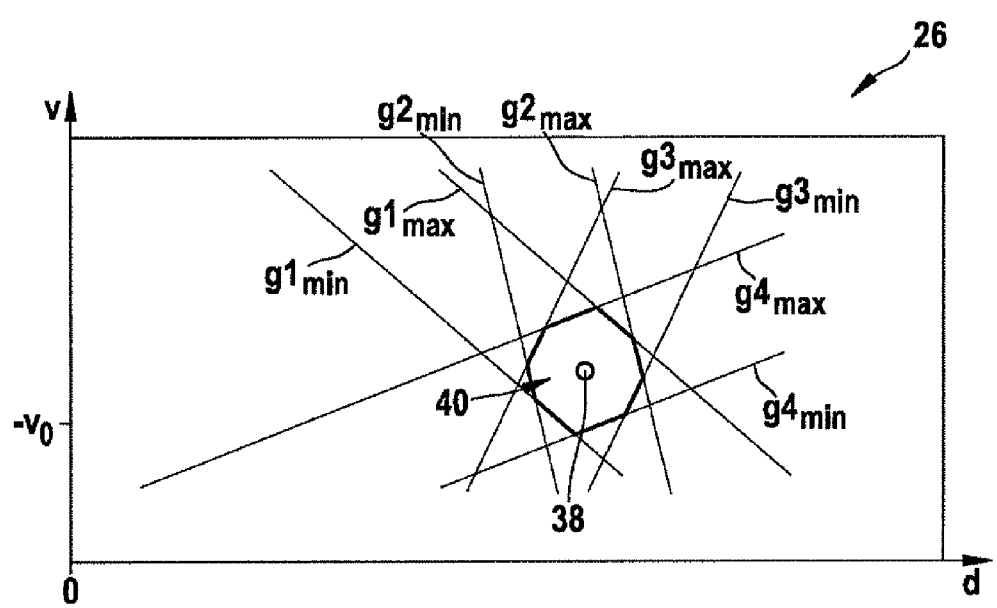
FIG. 4 shows a diagram for explaining a restriction of a d-v space to a subspace.

FIG. 4 represents such a predictive value supplied by the tracking module for a single object through a point 38 in the d-v diagram. This prediction, too, is naturally encumbered with a certain inaccuracy, since it is not known exactly how the speed of the respective object has changed since the last measuring cycle. However, it is to be expected that the object will be able to be found at least in the vicinity of point 38.

In a first step of the frequency matching procedure, the observed part of the d-v space is therefore limited to a subspace 40, which includes point 38, and whose dimensions correspond to the estimated inaccuracy of the predictive value. Tracking module 24 is in a position of also supplying estimated values for these inaccuracies in coordinates d and v. In the example shown, subspace 40 has the shape of an octagonal polygon. However, it may also optionally have the form of a rectangle, an ellipse or the like.

In the current measuring cycle, if the object that is followed is located, as expected, in subspace 40, the four associated straight lines g1-g4 (or in the case of a peak superposition, at least three of these straight lines) would have to pass through subspace 40. For frequencies k in the straight line equations of these straight lines, one could then give in each case a maximum value and a minimum value. When the shape and the position of subspace 40 are known, these maximum and minimum values come about from the condition that the appertaining straight line still touches the edge of the subspace at least one point.

Now, if for a given modulation ramp, for k one uses once the maximum value and once the minimum value, one obtains two parallel straight lines which enclose subspace 40 between them and touch its edge. In FIG. 4, these straight lines are designated for all four modulation ramps by $g1_{min}$, $g1_{max}$, $g2_{min}$, $g2_{max}$, $g3_{min}$, $g3_{max}$, $g4_{min}$ und $g4_{max}$.

In order to find the object within subspace 40, one may now proceed in such a way, for instance, that one first searches for a peak in the spectrum for the first modulation ramp, whose frequency k lies between the minimum value and the maximum value. Then one may correspondingly search, in the spectrum for the second modulation ramp, for a peak whose frequency k lies between the minimum value and the maximum value for this ramp, and check whether the two straight lines intersect within subspace 40. It is then checked whether one peak each may be found for the two remaining modulation ramps, whose associated straight line goes through the same intersection. In this context, one may limit the search in each case to the frequency interval between the minimum value and the maximum value for frequency k, whereby the computational effort is considerably reduced.

In the example shown in FIG. 4, the shape of subspace 40, for simplicity's sake, is selected in such a way that this subspace is bordered directly by straight lines $g1_{min}$, $g1_{max}$, $g2_{min}$, . . . .

In the manner described above, in the current measuring cycle, using comparatively little effort, those objects may be found again which had already been located in the preceding measuring cycle. In the example shown in FIG. 3, there are three such objects, which are represented by points filled out in black (coincidences) T. With the aid of predictive values supplied by tracking module 24, one appropriate subspace 40 is defined for each of these objects, and each of these subspaces is investigated for coincidences, so as to ascertain the current locations and speeds of the appropriate objects.

Figure 5:
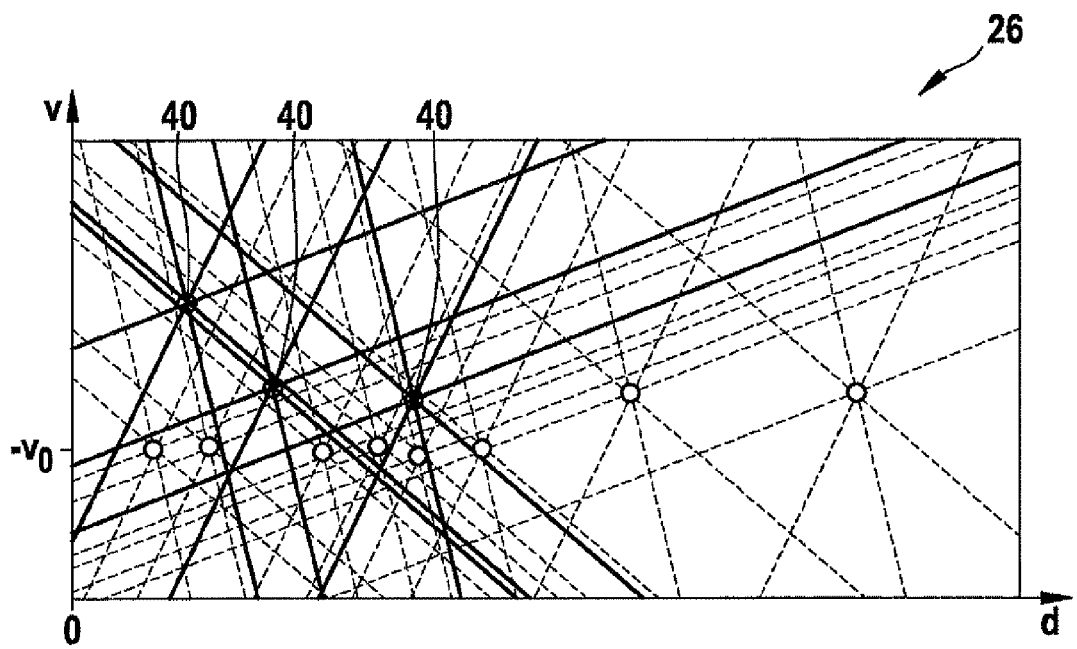
FIG. 5 shows a diagram of a d-v space for a first step of the method according to the present invention.

FIG. 5 shows subspaces 40 for the three coincidences T, and the straight lines, which have a quadruple coincidence within these subspaces, are drawn in in bold.

Figure 6:
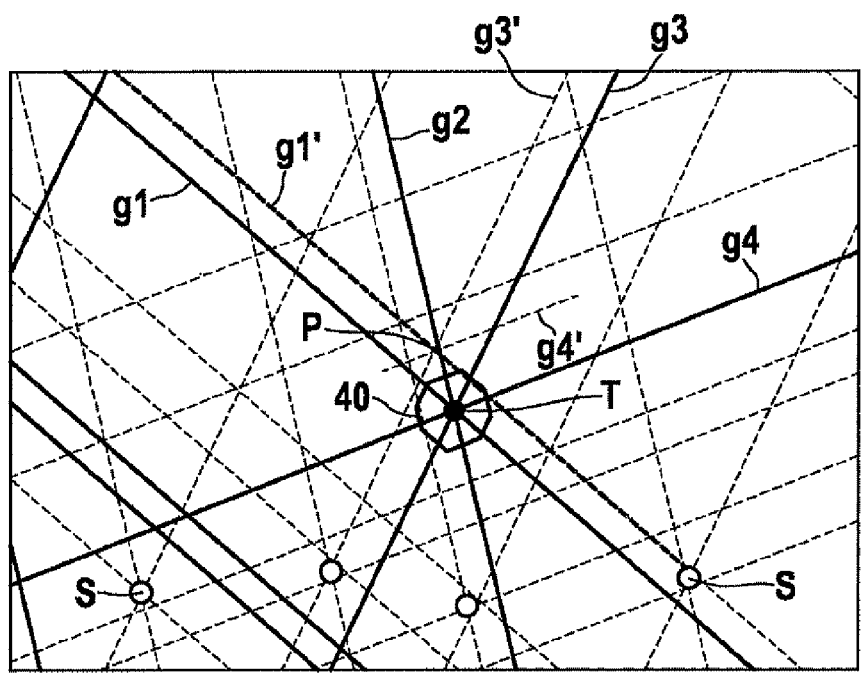
FIG. 6 shows an enlargement of a cut-out shown in FIG. 5.

FIG. 6 shows the surroundings of one of these subspaces 40 as in FIG. 5. The straight lines, which have a coincidence within this subspace, are again designated by g1-g4. A straight line g1' is drawn in, bold and in dashed form, which belongs to another peak in the spectrum for the first modulation ramp, and as a result runs parallel to straight line g1. The intersections of straight line g1' with straight lines g2-g4 would also be "candidates" for coincidences, in principle. In one of these intersections, designated by P, there indeed (by chance) appears to exist a triple coincidence with a straight line g3', which belongs to another object. However, this point P lies outside subspace 40 so that this coincidence and the appertaining object will in any case not be detected in the method step being observed in this instance. This would be the case even if a (non-shown) twelfth object were to contribute still another straight line g4', which goes approximately through the same point P (quadruple coincidence).

Using the method described up to now, only objects are found which were already followed previously in tracking module 24. In this example, these objects correspond to the three points that were designated by T in FIG. 3, and are filled out in black. But in addition, FIG. 3 shows another six points or coincidences S (in white), which represent standing objects.

These points lie within a narrow tube about speed $v=-v_0$. In addition, in FIG. 3 there are two coincidences N drawn in a hatched manner, which correspond to "new" objects that were not known up to now. The method steps explained below are used to identify the standing objects and the new objects.

Figure 7:
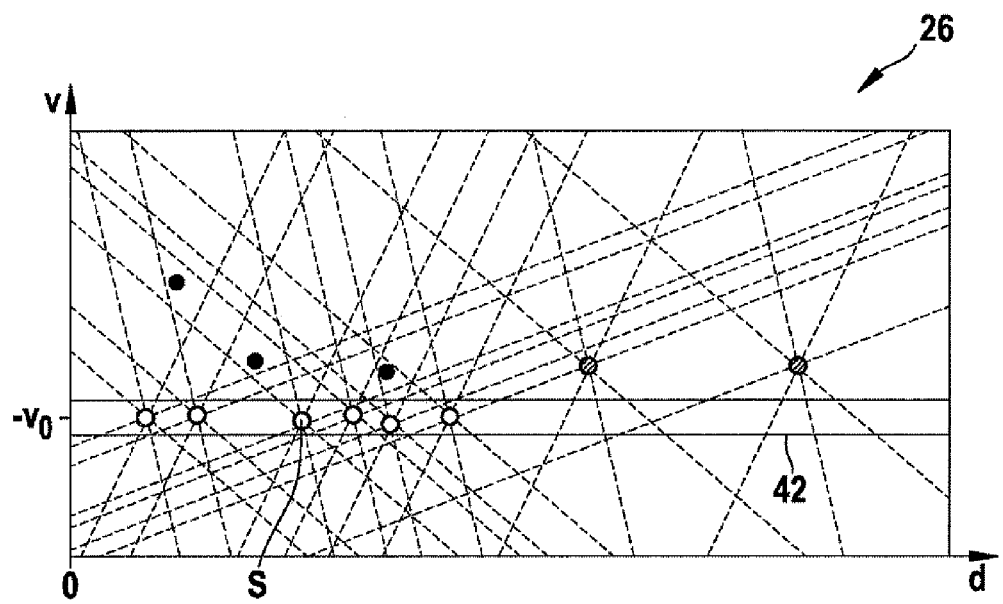
FIGS. 7-10 show diagrams of the d-v space as in FIG. 5 for subsequent steps of the method according to the present invention.

After all the objects known from the tracking (coincidences T) have been identified in subspaces 40, the straight lines associated with these objects (drawn in in bold in FIG. 5) are isolated for the further method. FIG. 7 shows d-v space 26 without these straight lines. Because of this, the number of intersections present overall has been considerably reduced.

Now, coincidences S are first searched for which represent the standing objects. For this purpose, the cutout of the d-v space being observed overall is restricted to a subspace 42, which corresponds to the tube about speed $-v_0$ that was mentioned. This restriction again leads to maximum values and minimum values of frequency k being defined for each modulation ramp, and the search may be restricted to the frequency bands lying between these maximum and minimum values, whereby the effort is further reduced. In addition, the search is restricted to quadruple coincidences within subspace 42. Since all six points T in FIG. 7 are such quadruple coincidences, all standing objects are found in this step.

Figure 8:
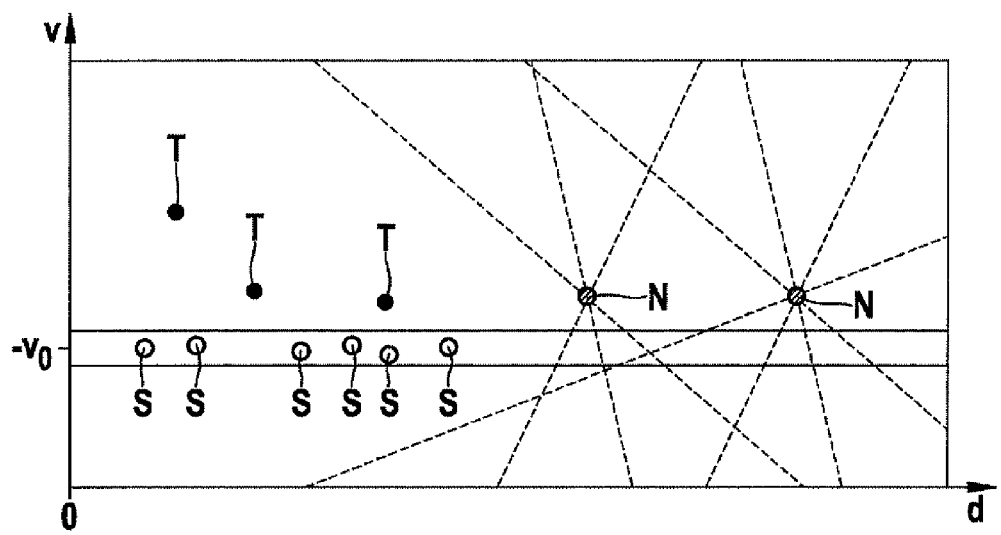
Figure 9:
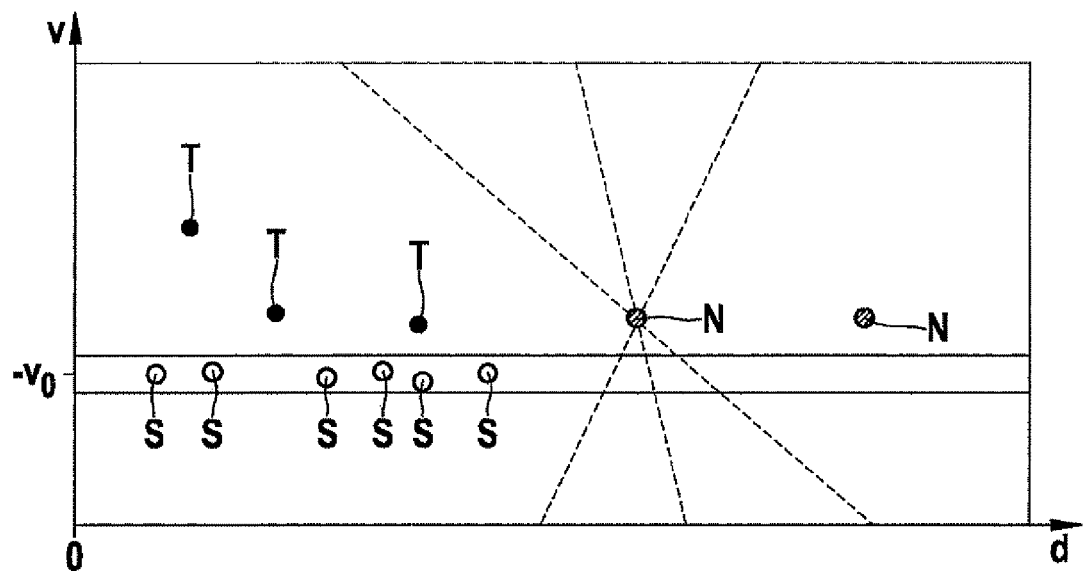

Now, in the next step, new objects are searched for which correspond to coincidences N. For this purpose, the search is extended to the full d-v space (more exactly stated, to a cutout of this space which includes all the d-v pairs that realistically come into consideration), and again all straight lines are isolated which belong to coincidences S. FIG. 8 shows the d-v space without these straight lines. Only seven straight lines remain, which form a quadruple coincidence in one of the two points N, and one triple coincidence in the other point N. The new object associated with the quadruple coincidence is directly detected, and the appertaining four straight lines are isolated, as shown in FIG. 9.

If a quadruple coincidence is required for identifying an object, second point N cannot be found. However, if FIGS. 7 and 9 are compared, it will be shown that in this point N, too, a quadruple coincidence was originally present. This coincidence has been destroyed, however, by isolating the straight line that went through this point N and one of points S (the point S lying farthest to the right in FIG. 7).

If the search for coincidences S, on the one hand, and the coincidences N, on the other hand, had taken place in reverse sequence, that is, if one had searched first for points N and then, after isolating the appertaining straight lines, for points T, both points N would have been identified as objects, but instead, one of points T would not have been detected as an object.

This being the case, the method described up to now is encumbered with a certain dependence on the sequence of the searching steps, with the result that, in the case of an unlucky choice of the sequence, faulty matches may occur or real objects may be overlooked.

Figure 10:
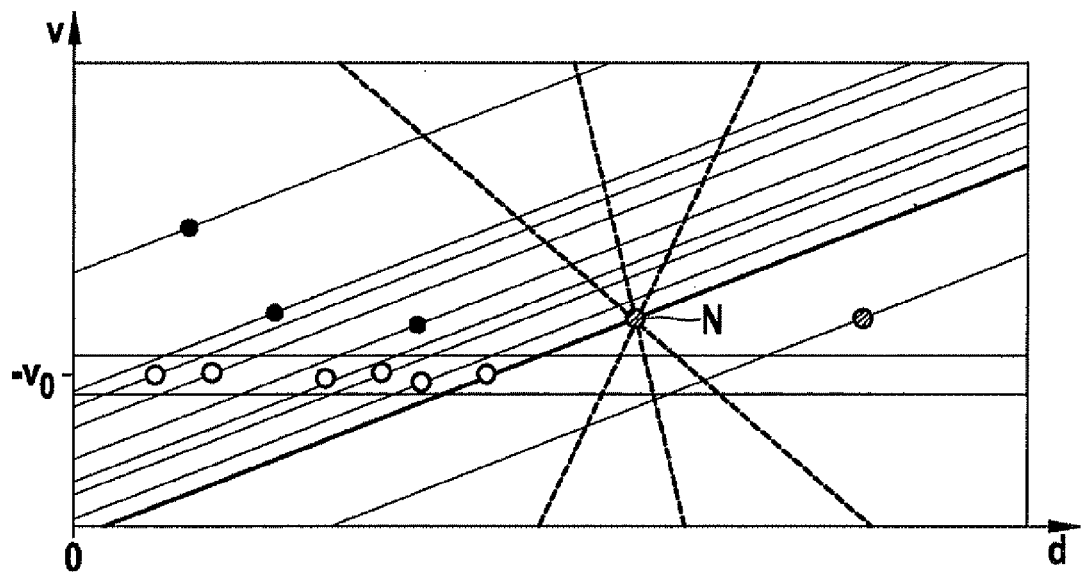

In order to mitigate this sequence dependence of the method, an additional step is added to the steps described so far, which is designated as "residual matching". In this residual matching, at least some of the straight lines previously isolated are reinserted, as shown in FIG. 10. In this instance, this especially involves the straight lines which are parallel to the straight lines missing for the quadruple coincidence. Thereby, in remaining point N, the quadruple coincidence that was lost has been reproduced, so that this point is now able to be identified with a real object.

This procedure is based on the following consideration. A false match is typically created when four straight lines, that belong to four different objects, intersect by chance (at sufficient accuracy) at one point, so that at this point the existence of a further object, that is actually not there, is pretended. In the method described here, however, since the straight lines are isolated as soon as the point, with which they are associated, has been identified with an object, normally, no more straight lines should be left over after all present objects have been detected. If, however, as in the example shown here, three straight lines still remain, which intersect at one point, this indicates that this intersection could correspond to a real object, and that the fourth straight line has only been omitted because, by chance, it also passes through another point that was detected earlier. Physically this would mean that the peaks, associated with these two points, are superimposed, in the spectrum for the respective modulation ramp, almost at the same frequency, and therefore cannot be resolved into two separate peaks, so that, in the d-v space, two points have to "share" one straight line, so to speak.

In such cases, one must assume that the peak, which is actually made up of a superposition of two peaks, will be relatively pronounced, that is, a relatively high power of the received radar signal concentrates at this frequency. In spite of such peak superpositioning, in order to be able to detect all the objects present, it is therefore expedient in the residual matching if those straight lines are reinserted which are associated with particularly high-power peaks. In this way a balance is reached which leads, on the one hand, to all the objects present being detected, as a rule, and, on the other hand, undesired false matches being avoided to the greatest possible extent.

In the method described up to this point it is assumed that, in the first step, results of tracking module 24 are already available which point to the probable locations of known objects. If, perhaps when switching on the radar sensor, no such tracking objects are present yet, this step cannot be carried out in this manner. In this special case, the method would begin with the search for standing objects (coincidences S), and all moved objects would first be identified as new objects (coincidences N).

In one other specific embodiment, it, is, however, also possible to specify a special subspace of the d-v space for the initiating phase, which extends over the distance range and/or speed range that are particularly relevant for the respective assistance function (e.g. adaptive cruise control).

The method may be varied in many ways, with respect to the number and sequence of the searching steps, and the search criteria used in this context. For the detection of an object, it may be expedient, for example, to let not only a quadruple coincidence suffice, but also a triple coincidence.

In the general case, in which the radar sensor works with N modulation ramps, which differ in the slopes of the ramps, the following sequence of search steps is currently regarded as being particularly expedient:
1. the search for tracking objects having N-fold coincidence
2. the search for tracking objects having (N−1)-fold coincidence
3. the search for standing objects having N-fold coincidence
4. the search for new objects having N-fold coincidence
5. the search for standing objects having (N−1)-fold coincidence
6. the search for new objects having (N−1)-fold coincidence
7. residual matching

What is claimed is:

1. A method for frequency matching in an FMCW radar sensor, comprising:
deriving a plurality of frequencies on a plurality of modulation ramps, each of the derived frequencies representing an object located by the radar sensor;
representing the derived frequencies in a distance-speed space as geometrical locations representing possible combinations of a distance d and a speed v of the respective object; and
searching for coincidences between the geometrical locations which belong to the frequencies derived on various modulation ramps, in order to identify the objects located on the various modulation ramps, wherein the searching for coincidences includes: (i) in a first step, restricting the search for coincidences to a selected first subspace of the distance-speed space, and (ii) subsequently expanding the search to other regions of the distance-speed space while suppressing the frequencies associated with the objects found in the first step.

2. The method as recited in claim 1, wherein the distances and the speeds of the detected objects are followed by a tracking module and predicted into the future, and wherein the selected first subspace of the distance-speed space is the neighborhood of at least one point which gives the predicted distance and the predicted speed of a followed object.

3. The method as recited in claim 2, wherein the first step of the search for coincidences is followed by a plurality of successive steps in which coincidences are searched for using different search criteria.

4. The method as recited in claim 3, wherein the search criteria for the plurality of successive steps differ in the selection of the subspaces.

5. The method as recited in claim 4, wherein one search criterion for a step following the first step is: coincidences are searched for in a selected second subspace which is defined by at least one of a limited distance interval and a limited speed interval.

6. The method as recited in claim 5, wherein the radar sensor is installed in a motor vehicle, and wherein relative speeds of the objects are represented in the distance-speed space, and wherein the selected second subspace is defined by a limited speed interval in the neighborhood of a relative speed which is equal and opposite to the speed of the vehicle.

7. The method as recited in claim 3, wherein the radar sensor works with N different modulation ramps, and wherein in at least one step of the search for coincidences, a search is made for coincidences in which all the frequencies derived on the N modulation ramps participate.

8. The method as recited in claim 3, wherein the radar sensor works with N different modulation ramps, and wherein in at least one step of the search for coincidences, a search is made for coincidences of frequencies derived on N−1 different modulation ramps.

9. The method as recited in claim 3, wherein the last step of the search for coincidences is a residual matching step, in which, at least some of the frequencies which were not taken into account in the previous steps of the search for coincidences are taken into account.

10. The method as recited in claim 9, wherein among the frequencies which were not taken into account in the previous steps of the search, only frequencies for which the power density in the spectrum lies above a selected threshold value are taken into account.

11. An FMCW radar sensor, comprising:
means for deriving a plurality of frequencies on a plurality of modulation ramps, each of the derived frequencies representing an object located by the radar sensor;
means for representing the derived frequencies in a distance-speed space as geometrical locations representing possible combinations of a distance d and a speed v of the respective object; and
means for searching for coincidences between the geometrical locations which belong to the frequencies derived on various modulation ramps, in order to identify the objects located on the various modulation ramps, wherein the searching for coincidences includes: (i) in a first step, restricting the search for coincidences to a selected first subspace of the distance-speed space, and (ii) subsequently expanding the search to other regions of the distance-speed space while suppressing the frequencies associated with the objects found in the first step.

12. A computer-readable data storage medium storing a computer program having program codes which, when executed on a computer, performs a method for frequency matching in an FMCW radar sensor, the method comprising:
deriving a plurality of frequencies on a plurality of modulation ramps, each of the derived frequencies representing an object located by the radar sensor;

representing the derived frequencies in a distance-speed space as geometrical locations representing possible combinations of a distance d and a speed v of the respective object; and searching for coincidences between the geometrical locations which belong to the frequencies derived on various modulation ramps, in order to identify the objects located on the various modulation ramps, wherein the searching for coincidences includes: (i) in a first step, restricting the search for coincidences to a selected first subspace of the distance-speed space, and (ii) subsequently expanding the search to other regions of the distance-speed space while suppressing the frequencies associated with the objects found in the first step.

* * * * *